United States Patent [19]

Pilato et al.

[11] 3,886,094

[45] May 27, 1975

[54] PREPARATION OF HYDROCARBON CONVERSION CATALYSTS

[75] Inventors: Joseph Michael Pilato, Silver Spring; John Storey Magee, Jr., Cooksville; Edwin Wolf Albers, Annapolis, all of Md.

[73] Assignee: W. R. Grace & Co., New York, N.Y.

[22] Filed: Dec. 22, 1972

[21] Appl. No.: 317,606

[52] U.S. Cl.............. 252/451; 252/453; 252/455 Z
[51] Int. Cl.............................................. B01j 11/40
[58] Field of Search................ 252/451, 452, 455 Z

[56] References Cited
UNITED STATES PATENTS

| | | | |
|---|---|---|---|
| 3,275,571 | 9/1966 | Mattox................................ | 252/451 |
| 3,595,611 | 7/1971 | McDaniel et al................ | 252/455 Z |
| 3,671,191 | 6/1972 | Maher et al. ....................... | 423/330 |

*Primary Examiner*—Carl F. Dees
*Attorney, Agent, or Firm*—Joseph P. Nigon

[57] ABSTRACT

Zeolite containing catalyst compositions are prepared by partially crystallizing a zeolite precursor reaction mixture which contains zeolite seed particles capable of initiating the rapid crystallization of zeolite to form a zeolite suspended in an excess of aqueous alkali metal silicate solution. The crystallization reaction is terminated after the desired quantity of zeolite has been formed, and the excess silicate is gelled to form an amorphous hydrogel matrix therefor. Preferably the process is conducted on a continuous basis.

5 Claims, No Drawings

PREPARATION OF HYDROCARBON CONVERSION CATALYSTS

The present invention relates to the preparation of hydrocarbon conversion catalysts, and more specifically to an improved method for preparing zeolite containing catalysts wherein crystalline aluminosilicate zeolite is dispersed in an inorganic oxide matrix.

For many years zeolite containing hydrocarbon conversion catalysts have been prepared by admixing an essentially fully crystalline aluminosilicate such as faujasite with amorphous inorganic oxides such as silica, silica-alumina, and alumina hydrogels. Typical prior art processes involve first forming a batch of crystalline alumino silicate zeolite by the hydrothermal reaction of silica, alumina, sodium hydroxide and water. Subsequent to obtaining the crystalline zeolite batch, the zeolite is recovered from its reaction medium (mother liquor) and combined with an amorphous gel component such as silica-alumina or silica-alumina hydrogel. The gelled zeolite-amorphous hydrogel composite is then washed to remove excess alkali metal salts, ion exchanged with polyvalent metal ions, and dried.

It has been found that the batchwise preparation of zeolite followed by incorporation in an amorphous gel matrix is a relatively expensive procedure from the standpoint of materials in that the excess sodium silicate solution which results from the batchwise preparation of zeolite is normally discarded. Furthermore, it is found that batch preparation of zeolite on a commercial scale, wherein literally tons of zeolite are formed, frequently leads to the preparation of products of varying quality.

Attempts to prepare zeolite catalysts on a commercial scale using essentially continuous processes have not been practical, primarily due to the fact preparation of fully crystalline zeolite requires reaction periods substantially longer than the subsequent catalyst forming operation.

It is therefore an object of the present invention to provide an improved method for preparing zeolite containing catalysts.

It is another object to provide a method by which conventional quantities of zeolite containing catalysts may be prepared on an essentially continuous basis.

It is a further object to provide a zeolite hydrocarbon conversion catalyst preparation method by which substantially full utilization of raw materials may be effectively obtained.

These and still further objects of the present invention will become readily apparent to one skilled in the art from the following detailed description and specific examples.

Broadly, our invention comprises a procedure wherein a crystalline aluminosilicate zeolite precursor reaction mixture containing zeolite seed particles, i.e., nucleation centers, which are effective for initiating the rapid crystallization of zeolite, is reacted to form partially crystalline zeolite product, and subsequently the partially crystalline reaction mixture is diluted with water, and combined with gel forming components such as mineral acid, carbon dioxide and/or acid aluminum salts.

More specifically, we have found that commercial quantities of crystalline zeolite containing catalysts may be quickly and economically prepared by the following procedures outlined below:

1. A zeolite precursor reaction mixture which contains alumina, silica, sodium hydroxide and water is admixed with amorphous silica-alumina seed particles, i.e., nucleation centers, which possess a particle size of below about 0.1 micron.

2. The precursor reaction mixture is reacted at a temperature of from about 90° C. to reflux to obtain about 15 to 100% crystallization of zeolite which is theoretically obtainable from the reactants present.

3. The partially crystallized zeolite reaction mixture is then diluted with sufficient water to dilute the excess sodium silicate present to a level of about 7 to 3% by weight $SiO_2$ basis. This dilution also serves to quench the crystallization about by lowering the reaction temperature to below abour 50° C.

4. The diluted reaction mixture is then admixed with an acidic component such as mineral acids, ($H_2SO_4$HCl or $HNO_3$), carbon dioxide and/or acid aluminum salts such as alum to gel the sodium silicate and thereby form an amorphous hydrogel matrix. At this point additional aluminum containing compounds such as sodium aluminate or other catalyst components such as clay may be added to the reaction mixture to impart the desired concentration of amorphous alumina and/or clay to the catalyst composition.

5. The gelled composition is then formed into desired particles such as by spray drying, washed to remove soluble salts such as sodium or sulfate ion, and dried to remove excess moisture. Optionally, the composition may be ion exchanged with stabilizing and/or catalytic promoter metal ions to enhance the stability and/or catalytic properties of the catalyst composition.

In a particularly preferred embodiment of the present invention the above outlined process is conducted on a continuous basis. Thus, for example, the zeolite crystallization process which requires only a few minutes due to the presence of highly active crystallization initiation seed particles, may be continuously performed in an elongated pipe type reactor. The reactor is maintained at a temperature of from about 95° to 110° C. at which crystallization of the faujasite rapidly takes place. At the point in the reactor wherein the desired degree of crystallization has occurred, normally from about 15 to 100% crystallization of theory, cold water is admitted to the reactor to lower the temperature of the reaction mixture to temperature of from about 40° to 50° C. This quenching water is added in amounts to achieve dilution of the excess silicate present in the faujasite reaction mixture to a level of from about 7 to 3% based on the weight of silicate present. The diluted zeolite reaction mixture is then admitted to a second elongated reactor to which an acidic gelling component is continuously added. The gel reaction mass is then washed to remove excess alkali metal and other soluble salts, spray dried, ion exchanged and finally dried using conventional spray drying or other catalyst forming procedures.

As indicated above, the zeolite precursor reaction mixture contains silica, alumina, water and alkali metal hydroxide. In general the composition of the precursor reaction mixture will depend upon the precise type zeolite which is to be produced. For example, when it is desired to produce type X or Y zeolite having a silica alumina ratio on the order of 2.5 to 6 the following ratios of ingredients may be utilized:

| Ingredient | Moles |
|---|---|
| $SiO_2$ | 2.5 to 16 |
| $Al_2O_3$ | 1 to 1 |
| $H_2O$ | 80 to 170 |
| $Na_2O$ | 3.0   7 |

On the other hand, when it is desired to prepare type A zeolite, the following reaction ratios may be utilized:

| Ingredient | Moles |
|---|---|
| $SiO_2$ | 1.5 to 2 |
| $Al_2O_3$ | 1 to 1 |
| $H_2O$ | 60 to 120 |
| $Na_2O$ | 1.0 to 1.8 |

The silicate may be derived from any convenient source such as sodium silicate or particulate colloidal silicas which are readily available for many commercial sources. The alumina component is provided from any convenient source such as sodium aluminate or other soluble aluminum salt such as aluminum sulfate, $Al(NO_3)_3$, $AlCl_3$.

The precursor reaction mixtures described in the above are combined with zeolite seed particles or nucleation centers which are capable of initiating the rapid crystallization of the crystalline aluminosilicate zeolite. Preferably these seeds, i.e., nucleation centers, are silica-alumina particles which are amorphous and which possess a particle size of below about 0.1 micron and a $SiO_2$ to $Al_2O_3$ ratio of 5 to 1. The zeolite seeds are prepared in the form of an aqueous slurry by reacting the following ratio of ingredients:

| Ingredient | Moles |
|---|---|
| $SiO_2/Al_2O_3$ | 14 to 16 |
| $Na_2O/Al_2O_3$ | 15 to 17 |
| $H_2O/Na_2O$ | 19 to 21 |

The seed preparation mixture is reacted at a temperature of from about 15° to 20° C. and allowed to stand 16–24 hours at room temperature. The resultant slurry which remains stable for a period of many weeks is then utilized to initiate the crystallization of zeolite from the precursor reaction mixture.

It is generally found that the seed slurry described above is added to the precursor reaction mixture in amounts ranging from about 5 to 20 parts by weight of the seed slurry per part by weight of the $Al_2O_3$ present in the zeolite precursor mixture. To prepare the partially crystalline zeolite product, the combined seed slurry and precursor reaction mixture is reacted for a period of from about 15 to 180 minutes at a temperature of about 90° to 110° C. whereat a partially crystalline product was formed which contains from about 10 to 100% crystalline zeolite which is theoretically obtainable from the reaction mixture if the reaction were permitted to run to completion. As indicated above, water is then added to the reaction mixture to terminate the crystallization procedure and to further dilute the excess alkali metal silicate present. Generally sufficient water is added to lower the temperature at least to 50°C. and to dilute the silicate to a level wherein the aqueous solution of silicate contains from about 7 to 3% sodium silicate.

The reaction slurry, after the partial crystallization has taken place, is then combined with an acid gelling agent. These gelling agents may be selected from the group consisting of mineral acids such as sulfuric acid, hydrochloric acid or nitric acid. Gelling agents such as carbon dioxide may also be effectively used to gel the excess silicate. Furthermore, it is contemplated that acid aluminum salts such as alum may be utilized. Furthemore, it is sometimes found that a combination of gelling Furthermore, including acid and alum may be effectively used.

Furthermore, it is contemplated that additional catalyst ingredients, such as clay, may be effectively added to the gelled compositions in amounts ranging from about 25 to 50% by weight of the finished catalyst composition.

The gelation step is preferably conducted on a continuous basis and in connection with a continuous crystallization procedure such as outlined above. Furthermore, it is contemplated that the gelation procedure may be conducted on a batchwise basis, however, the primary benefit obtained in the present invention results when a continuous overall catalyst preparation procedure is conducted.

Subsequent to gelation of the catalyst composition, the solid catalyst is recovered from the mother liquor and washed to remove soluble salts. Furthermore, the catalyst is ion exchanged with dilute ammonium salts such as dilute ammonium sulfate to further reduce the sodium level of the catalyst. The catalyst is then slurried and formed into catalyst particles of a desired configuration. In a particularly preferred practice of the invention, the catalyst slurry is spray dried to form microspheres having a particle size ranging from about 50 to 300 microns. Alternatively, the catalyst may be pilled or formed into granules having particle sizes on the order of ⅛ to ¼ inches in diameter. Subsequent to spray drying the catalyst may be further ammonium exchanged to remove additional alkali metal salts to a level below about 0.6% $Na_2O$. The catalyst may be ion exchanged with polyvalent metal ions such as rare earth ions to further enhance the stability of the catalytic properties of the catalyst composition.

The catalysts prepared in accordance with the present invention will generally contain from about 15 to 35% by weight zeolite calculated on total weight basis. Furthermore, the catalyst may contain a matrix which is essentially synthetic or the matrix may contain substantial quantities of clay such kaolin. koalin. The catalysts prepared in accordance with the present invention wherein faujasite is used as the zeolite and rare earth ions are exchanged therein are particularly effective for the catalytic cracking of hydrocarbons. These catalysts possess both good catalytic activity and good attrition properties when utilized in commercial cracking units.

Having described the basic aspects of the present invention, the following examples are given to illustrate specific embodiments thereof.

EXAMPLE I

A series of catalyst samples was prepared using the teachings of our invention.

a. Three samples of faujasite precursor reaction mixture as follows:

To 284 g of sodium aluminate solution containing 0.333 mole of $Al_2O_3$ and 0.466 mole of $Na_2O$, were added slowly with stirring to 1,422 g of sodium silicate solution having a density of 1.360 g/cc and 954 g of water.

b. A zeolite seed preparation was prepared as follows:

158 g of NaOH were added 558 g of $H_2O$. This solution was heated to 80° C. at which point 26 g of C-31 $Al_2O_3$ (65% $Al_2O_3$) was added slowly and stirred until completely dissolved. The solution was cooled to 15°C. and maintained at this temperature while 555 g of sodium silicate solution (27% $SiO_2$, 8% $N_2O$) was slowly added. The resulting seed solution was allowed to sit for 16 hours prior to use.

c. 248 g samples of the seed preparation were added to each of the above reaction mixture samples. The mixtures were heated at reflux (110°C) for 1.5 hours.

d. The heating was stopped and each sample was diluted with 4,840 g of water having a temperature of 40°C. This addition of water resulted in dilution of the sodium silicate solution in the reaction mixture to a level of 5.5% silica.

e. The mixtures were cooled to 80°F and gelled with 8% aluminum sulfate solution until the pH of the gelled mixtures reached 9.0 (Sample 1), 10.0 (Sample 2), and 10.7 (Sample 3), respectively. The samples were then aged for ½ hour. Additional aluminum sulfate (5% solution) (50–100 g) was added to give a total silica to alumina ratio of 3:1.

f. The samples were washed with 1% $(NH_4)_2SO_4$ and rare earth exchanged with $ReCl_3$ to yield catalyst samples having the following characteristics:

Table I

| Sample No. | wt. % Zeolite | wt. % $RE_2O_3$ | Surface Area $m^2/g$ |
|---|---|---|---|
| 1 | 31 | 7.7 | 174 |
| 2 | 27 | 6.4 | 158 |
| 3 | 35 | 8.0 | 200 |

The zeolite was a type Y zeolite having a $SiO_2/Al_2O_3$ of 5/1. The zeolite content in the above samples was determined by x-ray diffraction.

EXAMPLE II

A larger catalyst sample was prepared as follows:

To 9.94 pounds of a sodium aluminate solution, which contained 0.333 mole of $Al_2O_3$ and 0.466 mole of $Na_2O$, 33.6 pounds of $H_2O$ and 58.3 pounds of sodium silicate solution which contained 27% by wt. $SiO_2$ and 8.2% by wt. $Na_2O$, were added. To this mixture 8.68 pounds of the zeolite seed preparation, prepared by the procedure of Example I (b), were added. The mixture was heated at reflux (110° C) for 1.5 hours.

The heating was stopped and 175 pounds of $H_2O$ were added to dilute the reaction mixture. The concentration of excess silicate in the reaction mother liquid was 5.5 wt.% $SiO_2$. The mixture was cooled to 80° F and gelled by the addition of 70 pounds of 5% aluminum sulfate solution. The pH of the mixture was 10.7. The mixture was aged for ½ hour at a temperature of 80°F.

After aging, an additional 2 pounds of $Al_2(SO_4)_3$ solution were added to yield a total $SiO_2/Al_2O_3$ ratio of 3/1.

The product was washed with 10% $(MH_4)_2SO_4$ and rare earth exchanged with $ReCl_3$. The product was spray dried to yield a catalyst having the following properties:

Table II

| Sample No. | % Zeolite* (wt.) | %$RE_2O_3$ (wt.) | Surface Area $(m^2/g)$ |
|---|---|---|---|
| 4 | 32 | 4.0 | 413 |

*wt.% type Y zeolite calculated on basis of $SiO_2$ and $Al_2O_3$ content.

EXAMPLE III

The catalyst samples prepared in Examples I and II were evaluated for activity and selectivity as catalytic cracking catalysts in a pilot unit operated at 920°F, a catalyst to oil ratio of 4, and a weight hourly space velocity (WHSV) of 40 and 60. The feed stock was a West Texas Devonian gas oil having a boiling range of 653° to 931°F.

Prior to testing, all catalyst samples were deactivated by steaming at 1,520°F using 20% steam, at atmospheric pressure for 12 hours. The results are set forth in Table III.

Table III

| Sample No. | % Coke | % Conversion |
|---|---|---|
| 1 | 5.3 | 88 |
| 2 | 3.9 | 82.6 |
| 3 | 8.0 | 94 |
| 4 | 2.78 | 84.6 |

For purposes of comparison a sample of commercial catalyst (CBZ-1) which contained rare earth exchanged type Y zeolite was evaluated and compared with Sample 4 as set forth in Table IV.

Table IV

| Sample No. | 4 | 4 | CBZ-1 |
|---|---|---|---|
| WHSV | 40 | 60 | 40 |
| Conversion, vol. % | 83.0 | 82.0 | 72 |
| $H_2$, wt.% | .043 | .052 | .037 |
| $C_1 + C_2$, wt.% | 2.07 | 2.21 | 2.2 |
| Total $C_3$, vol.% | 12.7 | 10.7 | 10.1 |
| $C_3^=$, vol. % | 11.4 | 9.5 | 8.3 |
| Total $C_4$, vol.% | 16.4 | 15.7 | 11.2 |
| $C_4^=$, vol.% | 5.7 | 5.7 | 3.3 |
| $iC_4$, vol.% | 9.5 | 9.1 | 6.8 |
| $C_5$+ Gasoline, vol.% | 69.5 | 66.1 | 52.4 |
| Coke, wt. % | 4.9 | 5.9 | 5.7 |
| Gasoline/Conv. | 0.83 | 0.81 | 0.80 |
| % Zeolite Promoter | 32 | 32 | 16 |
| %$Re_2O_3$ | 7.20 | 7.20 | 3.37 |

We claim:

1. A process for preparing crystalline alumino silicate containing catalysts which comprises:
   a. forming a zeolite precursor reaction mixture containing silica, alumina, sodium hydroxide and water and crystallization initiating amorphous silica-alumina nucleation centers having a particle size below about 0.1 micron;
   b. heating said reaction mixture to a temperature of from about 90° to 110°C. for about 15 to 120 minutes to produce about 15 to 100% of the crystalline zeolite theoretically available to said reaction mixture;

c. diluting said reaction mixture with sufficient water to yield a sodium silicate solution concentration of from about 3 to 7% by weight $SiO_2$ in said reaction mixture;

d. gelling said reaction mixture with a gelling mixture selected from the group consisting of mineral acids, $CO_2$, aluminium salts and mixtures thereof to produce an amorphous hydrogel composite having crystalline zeolite dispersed therein;

e. ammonium exchanging said composite to lower the $Na_2O$ content thereof to below about 1% by weight;

f. exchanging said ammonium exchanged product with a rare earth salt solution;

g. washing and drying said composite to produce a particulate catalyst.

2. The process of claim 1 wherein the process is conducted on a continuous basis.

3. The process of claim 1 wherein the said crystalline zeolite has a silica to alumina ratio on the order of from about 2.5 to 6.

4. The method of claim 1 wherein said composite is spray dried to produce a microspheroidal product having a particle size on the order of 50 to 300 microns.

5. The method of claim 1 wherein said partially crystalline zeolite reaction mixture is admixed with clay in an amount equal to from about 10 to 30% by weight.

\* \* \* \* \*